(12) United States Patent
Hayashi

(10) Patent No.: US 8,400,028 B2
(45) Date of Patent: Mar. 19, 2013

(54) BRUSHLESS ROTARY ELECTRIC MACHINE

(75) Inventor: Hideyuki Hayashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 585 days.

(21) Appl. No.: 12/686,825

(22) Filed: Jan. 13, 2010

(65) Prior Publication Data
US 2011/0101803 A1 May 5, 2011

(30) Foreign Application Priority Data
Oct. 30, 2009 (JP) ................................. 2009-250887

(51) Int. Cl.
*H02K 9/00* (2006.01)
(52) U.S. Cl. ............................................. 310/52; 310/58
(58) Field of Classification Search .................... 310/52, 310/54, 58, 59, 60 A
See application file for complete search history.

(56) References Cited

U.S. PATENT DOCUMENTS

| | | | |
|---|---|---|---|
| 7,352,091 B2 * | 4/2008 | Bradfield | 310/68 D |
| 2003/0020338 A1 * | 1/2003 | Hirsou et al. | 310/52 |
| 2006/0012253 A1 * | 1/2006 | Vasilescu | 310/58 |
| 2007/0210662 A1 * | 9/2007 | Bradfield | 310/90 |
| 2007/0252488 A1 | 11/2007 | Kusase et al. | |
| 2008/0197727 A1 | 8/2008 | Dubuc et al. | |
| 2009/0108714 A1 * | 4/2009 | Fakes | 310/60 A |

FOREIGN PATENT DOCUMENTS

| | | |
|---|---|---|
| CN | 101064453 A | 10/2007 |
| CN | 101185222 A | 5/2008 |
| JP | 57-016559 A | 1/1982 |
| JP | 01-202140 A | 8/1989 |
| JP | 01-274640 A | 11/1989 |
| JP | 05-002571 U | 1/1993 |
| JP | 08223866 A | 8/1996 |
| JP | 53-052323 U | 9/2011 |

\* cited by examiner

*Primary Examiner* — Nguyen N Hanh
(74) *Attorney, Agent, or Firm* — Sughrue Mion, PLLC

(57) ABSTRACT

Provided is a brushless AC generator for a vehicle, with improved cooling performance for an exiting core and an exciting coil. In the brushless AC generator for the vehicle, a rotor includes: magnetic-pole cores fixed to a shaft; a cylindrical exciting core fixed to a rear bracket, the exciting core being inserted into one of the magnetic-pole cores; and an exciting coil formed by winding a conductor around a minor-diameter portion of the exciting core. The rear bracket includes: vent holes for the rotor, through which cooling air generated by rotation of a cooling fin passes, the vent holes for the rotor being formed around a bearing housing portion for housing a rear bearing therein; and a guiding portion including an air duct for guiding the cooling air, which has passed through the vent holes for the rotor, to the exciting core.

5 Claims, 2 Drawing Sheets

BRUSHLESS ROTARY ELECTRIC MACHINE

BACKGROUND OF THE INVENTION

1. Field of the Invention

The present invention relates to a brushless rotary electric machine to be mounted in a vehicle as, for example, a brushless AC generator.

2. Description of the Related Art

Conventionally, the following AC generator for an automobile is known. The AC generator includes a case, a stator, a shaft, a rotor, and a cooling fan. The case includes a pair of brackets, i.e., a first bracket and a second bracket, which are opposed to each other. The stator is fixed to the case. Two ends of the shaft are rotatably supported respectively by the first bracket and the second bracket through an intermediation of bearings. The rotor is provided to the shaft. The cooling fan is fixed to the shaft. The rotor includes a magnetic-pole core fixed to the shaft, a cylindrical exciting core fixed to the first bracket while being inserted into the magnetic-pole core, and an exiting coil obtained by winding a conductor around a minor-diameter portion of the exciting core (for example, see JP 57-16559 A (FIG. 1)).

In the above-mentioned AC generator for the automobile, vent holes are formed through the rear bracket at positions so as to face a diode and a regulator. Therefore, cooling air generated by the rotation of the cooling fan passes through the diode and the regulator. After that, the cooling air reaches the exciting core and the exciting coil through the vent holes. Therefore, there are the following problems.

A. After cooling the diode and the regulator, the cooling air cools the exciting core and the exiting coil. Therefore, the exciting core and the exciting coil are cooled with the warmed cooling air. Therefore, cooling performance for the exiting core and the exciting coil is low.

B. There is no structure in an internal space after the cooling air passes through the vent holes, and hence the cooling air is disadvantageously diffused in the internal space. The exciting core and the exciting coil are cooled by the diffused cooling air, and hence the cooling performance for the exciting core and the exciting coil is low.

SUMMARY OF THE INVENTION

The present invention has an object to solve the problems described above, and has an object to provide a brushless rotary electric machine with improved cooling performance for an exciting core and an exciting coil.

A brushless rotary electric machine according to the present invention includes: a case including a pair of a first bracket and a second bracket which are opposed to each other; a stator fixed to the case; a shaft having two ends rotatably supported respectively by the first bracket and the second bracket through an intermediation of bearings; a rotor provided to the shaft; and a cooling fan fixed to the shaft. In the brushless rotary electric machine, the rotor includes: magnetic-pole cores fixed to the shaft; a cylindrical exciting core fixed to the first bracket, the exciting core being inserted into one of the magnetic-pole cores; and an exciting coil formed by winding a conductor around a minor-diameter portion of the exciting core; and the first bracket includes vent holes for the rotor, through which cooling air generated by rotation of the cooing fan passes, the vent holes for the rotor being formed around a bearing housing portion for housing the bearing therein; and a guiding portion including an air duct for guiding the cooling air, which has passed through the vent holes for the rotor, to the exciting core.

In the brushless rotary electric machine according to the present invention, the first bracket includes: the vent holes for the rotor, through which the cooling air generated by the rotation of the cooling fan passes, the vent holes for the rotor being formed around the bearing housing portion which houses the bearing therein; and the guiding portion including the air duct for guiding the cooling air, which has passed through the vent holes for the rotor, to the exciting core. Therefore, the cooling air from outside air flowing through the vent holes for the rotor into the first bracket flows to the exciting core to cool the exciting core. Therefore, cooling performance for the exciting core and the exciting core which is integral with the exciting coil is improved.

DETAILED DESCRIPTION OF THE PREFERRED EMBODIMENT

First Embodiment

Hereinafter, a brushless AC generator for a vehicle (hereinafter, referred to simply as an AC generator) according to a first embodiment of the present invention is described with reference to the accompanying drawings.

Figure 1:
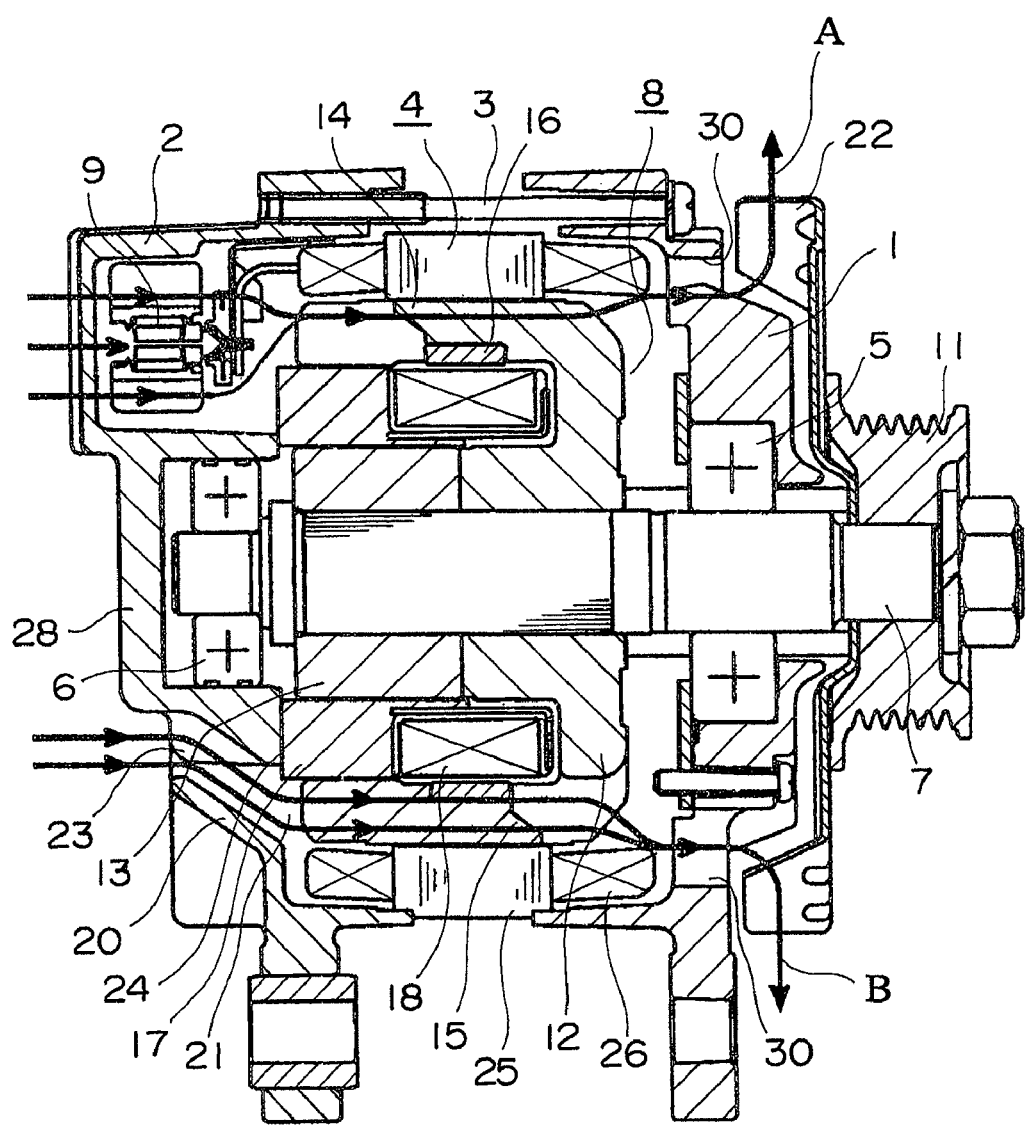
FIG. 1 is a sectional side view illustrating a brushless AC generator for a vehicle, according to a first embodiment of the present invention.
Figure 2:
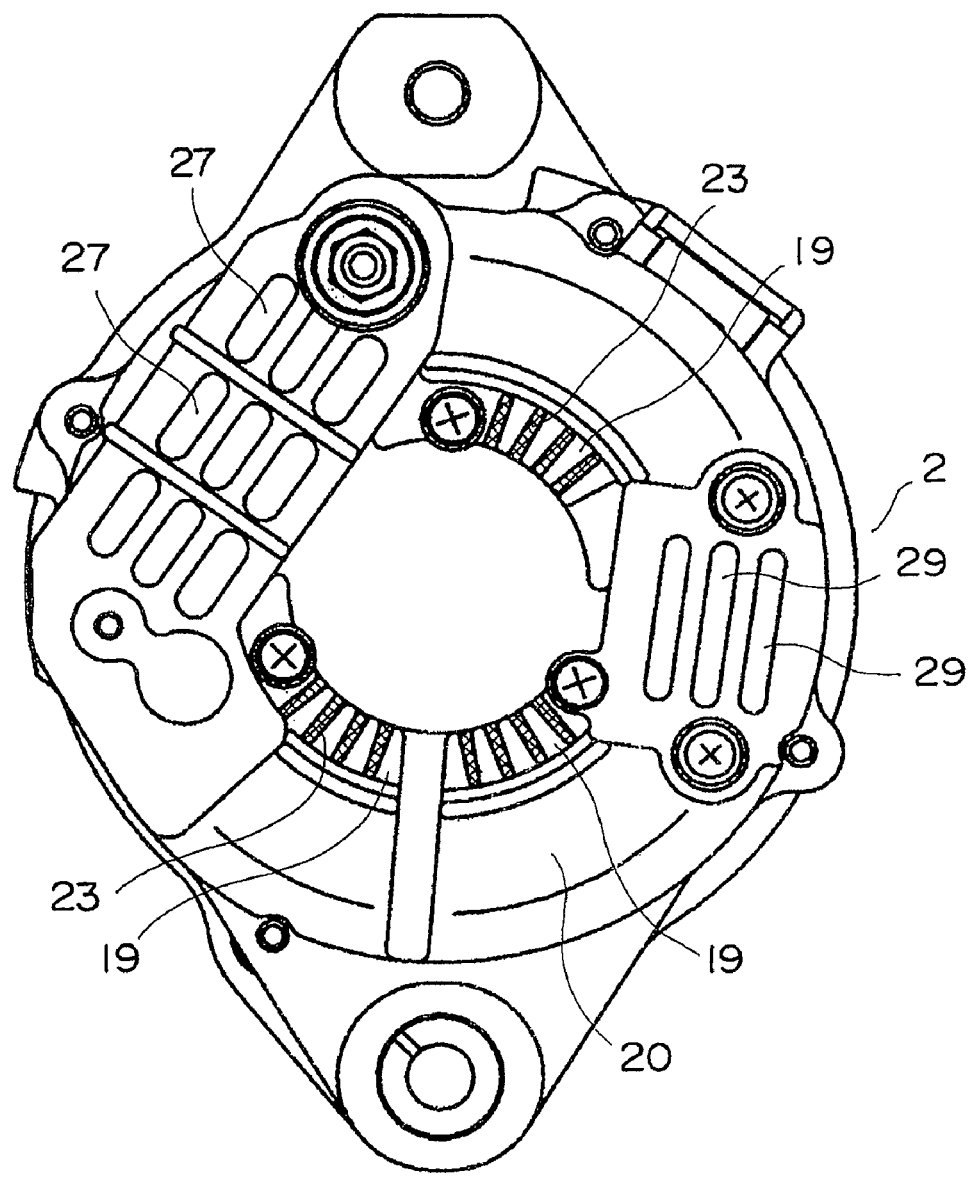
FIG. 2 is a front view illustrating the brushless AC generator for a vehicle, which is illustrated in FIG. 1, as viewed from the side of a rear bracket.

FIG. 1 is a sectional side view illustrating the AC generator corresponding to a brushless rotary electric machine, and FIG. 2 is a front view illustrating the AC generator illustrated in FIG. 1 as viewed from the side of a rear bracket 2.

The AC generator includes a case including a front bracket 1 and the rear bracket 2, a stator 4, a shaft 7, a rotor 8, a rectifier 9, and a regulator (not shown). The case is formed by integrating the front bracket 1 and the rear bracket 2 with a through bolt 3. The stator 4 is fixed onto an inner peripheral wall of the case. Two ends of the shaft 7 are rotatably supported by a front bearing 5 mounted to the front bracket 1 and a rear bearing 6 mounted to the rear bracket 2, respectively. The rotor 8 is provided to the shaft 7. The rectifier 9 is fixed to the rear bracket 2 to be electrically connected to the stator 4 so as to convert an AC output into a DC. The regulator is fixed to the rear bracket 2 and controls the AC voltage generated by the stator 4 to be within a predetermined range.

One of the ends of the shaft 7 externally extends beyond the front bracket 1. A pulley 11 is fixed to the extending portion of the shaft 7. A belt (not shown) is looped around the pulley 11 and an engine (not shown) so as to bridge the pulley 11 and the engine. In this manner, the shaft 7 is rotated by driving the engine through an intermediation of the belt. A cooling fan 22 fixed to the shaft 7 is provided between the pulley 11 and the front bracket 1.

The rotor 8 includes a front magnetic-pole core 12 and a rear magnetic-pole core 13. The front magnetic-pole core 12 is fixed to the shaft 7 and includes a plurality of equiangularly formed front claw-like magnetic pole portions 14. The rear magnetic-pole core 13 includes a plurality of rear claw-like magnetic pole portions 15 to mesh with the front claw-like magnetic pole portions 14. In addition, the rear magnetic-pole core 13 is in surface contact with the front magnetic-pole core 12 on their base end surfaces.

Moreover, the rotor 8 also includes a cylindrical exciting core 17 which is fixed to the rear bracket 2 and is inserted into the rear magnetic-pole core 13, an exciting coil 18 obtained by winding a conductor around a minor-diameter portion of the exciting core 17, and an annular ring 16 bonded onto inner circumferential surfaces of the front claw-like magnetic pole portions 14 and inner circumferential surfaces of the rear claw-like magnetic pole portions 15 over the entire circumference by welding, brazing, or the like.

Each of the front magnetic-pole core 12, the rear magnetic-pole core 13, and the ring 16 is made of a non-magnetic metal.

The stator 4 includes a cylindrical stator core 25 obtained by laminating thin steel plates, and a stator coil 26 wound around the stator core 25, which is electrically connected to the rectifier 9.

The rear bracket 2 formed by aluminum die-casting includes a bearing housing portion 28 which houses the rear bearing 6 therein. Around the bearing housing portion 28, vent holes for the rotor are formed so as to be opposed to each other. Each of the vent holes for the rotor is divided into a plurality of vent hole portions 19 for the rotor by a plurality of cooling fins 23. Each of the cooling fins 23 is provided to extend inwardly in an axial direction to reach an end surface of the exciting core 17.

The rear bracket 2 also includes a guiding portion 20 having a radial dimension which increases from the vent hole portions 19 for the rotor along an axially inward direction. By the guiding portion 20, an air duct 21 for guiding cooling air, which has passed through the vent hole portions 19 for the rotor, to the exciting core 17 is formed.

Moreover, vent holes 27 for the rectifier, which are formed to be opposed to the front side of the rectifier 9, and vent holes 29 for the regulator, which are formed to be opposed to the front side of the regulator, are formed through the rear bracket 2.

The rear bracket 2 and the exciting core 17 are in close contact with each other through an intermediation of a thermally-conductive silicone compound 24 therebetween.

A plurality of exhaust holes 30 are formed through the front bracket 1 formed by aluminum die-casting.

In the thus configured AC generator, a current is supplied from a battery (not shown) to the exciting coil 18 which is fixed to the rear bracket 2 through an intermediation of the exciting core 17. As a result, a magnetic flux is generated. With the thus generated magnetic flux, the front claw-like magnetic pole portions 14 are magnetized to the N-pole, whereas the rear claw-like magnetic pole portions 15 are magnetized to the S-pole.

On the other hand, the pulley 11 is driven by the engine to rotate the shaft 7. As a result, the front magnetic-pole core 12 and the rear magnetic-pole core 13 of the rotor 8 rotate to apply a rotating magnetic field to the stator core 25. As a result, an electromotive force is generated in the stator coil 26. The AC electromotive force is rectified into the DC by the rectifier 9 to charge the battery.

On the other hand, the cooling fan 22 rotates with the rotation of the shaft 7. As a result, the cooling air flowing through the vent holes 27 for the rectifier passes mainly through the rectifier 9 and a gap between the stator 4 and the rotor 8 to be exhausted to the exterior through the exhaust holes 30, as is indicated by an arrow A.

The cooling air flowing through the vent holes 29 for the regulator passes mainly through the regulator (not shown) and the gap between the stator 4 and the rotor 8 to be exhausted to the exterior through the exhaust holes 30.

Moreover, the cooling air flowing through the vent hole portions 19 for the rotor flows along the guiding portion 20 into the case to pass through the gap between the stator 4 and the rotor 8 to be exhausted to the exterior through the exhaust holes 30, as indicated by an arrow B.

According to the AC generator of this embodiment, the rear bracket 2 includes the vent holes for the rotor and the guiding portion 20. Specifically, the vent holes for the rotor are formed around the bearing housing portion 28 for housing the rear bearing 6 therein. Through the vent holes for the rotor, the cooling air generated by the rotation of the cooling fan 22 passes. The guiding portion 20 includes the air duct 21 for guiding the cooling air, which has passed through the vent holes for the rotor, to the exciting core 17. Therefore, the cooling air from outside air, which flows through the vent holes for the rotor into the rear bracket 2, flows to the exciting core 17 to cool the exciting core 17. Accordingly, the cooling performance for the exciting core 17 and the exciting coil 18 which is integral with the exciting core 17 is improved.

Moreover, the vent holes for the rotor are formed around the bearing housing portion 28, and hence the effects of improving the cooling performance for the rear bearing 6 are also obtained.

Moreover, the rear bracket 2 includes the guiding portion 20 which has the radial dimension increasing along the axially inward direction over the entire circumference except for the portions which are opposed to the rectifier 9 and the regulator. Therefore, the cooling air, which has passed through the vent holes for the rotor, collides against a larger area of the end surface of the cylindrical exciting core 17. Thus, the exiting core 17 is efficiently cooled.

Moreover, the rear bracket 2 includes the cooling fins 23 formed by dividing the vent holes for the rotor into the plurality of the vent hole portions 19 for the rotor. Therefore, a heat-releasing area of the rear bracket 2 is increased to correspondingly improve the heat-releasing properties of the rear bracket 2.

Moreover, the cooling fins 23 also serve to guide the cooling air to the exiting core 17 and the exciting coil 18 together with the guiding portion 20, and hence the cooling performance for the exciting core 17 and the exciting coil 18 is further improved.

Further, by providing the cooling fins 23, the size of each of the vent hole portions 19 for the rotor is reduced. Correspondingly, an inconvenience in that the components such as a bolt and a screw slip into the case through the vent hole portions 19 for the rotor can be prevented from occurring.

Further, each of the cooling fins 23 is provided to extend inwardly in the axial direction to reach the end surface of the exciting core 18, and hence heat of the exciting core 17 is released to the exterior by thermal conduction through the cooling fins 23. Thus, the cooling performance for the exiting core 17 and the exciting coil 18 is further improved.

Further, the rear bracket 2 and the exciting core 17 are in close contact with each other through the intermediation of the thermally-conductive silicone compound 24 therebetween, and hence a thermal resistance between the rear bracket 2 and the exciting core 17 is reduced to improve a thermal conductivity from the exciting core 17 to the rear bracket 2.

Moreover, salt water or the like can be prevented from entering a gap between the rear bracket 2 and the exciting core 17, and hence rust can be prevented from being caused on the exciting core 17 due to a difference in ionization tendency of metal between the rear bracket 2 made of aluminum and the exiting core 17 made of iron. Accordingly, a predetermined area of a magnetic path of the exciting core 17 and a predetermined thermal conductivity of the exciting core 17 can be ensured.

Although the brushless AC generator for a vehicle has been described as the brushless rotary electric machine in the embodiment described above, it is apparent that the present invention is not limited to the use for the vehicles. For example, the present invention is also applicable to a brushless AC generator for an outboard motor and also to a brushless electric motor.

Further, the silicone compound 24 is merely an example, any thermally conductive compounds may be used instead.

What is claimed is:

1. A brushless rotary electric machine, comprising:
    a case comprising a pair of a first bracket and a second bracket, which are opposed to each other;
    a stator fixed to the case;
    a shaft having two ends rotatably supported respectively by the first bracket and the second bracket through an intermediation of bearings;
    a rotor provided to the shaft; and
    a cooling fan fixed to the shaft,
    wherein:
        the rotor comprises: magnetic-pole cores fixed to the shaft; a cylindrical exciting core fixed to the first bracket, the exciting core being inserted into one of the magnetic-pole cores; and an exciting coil formed by winding a conductor around a minor-diameter portion of the exciting core; and
        the first bracket comprises: vent holes for the rotor, through which cooling air generated by rotation of the cooling fan passes, the vent holes for the rotor being formed around a bearing housing portion for housing the bearing therein; and a guiding portion comprising an air duct for guiding the cooling air, which has passed through the vent holes for the rotor, to the exciting core; and
        the first bracket comprises cooling fins which divide each of the vent holes for the rotor into a plurality of vent hole portions for the rotor.

2. A brushless rotary electric machine according to claim 1, wherein the guiding portion has a radial dimension increasing along an axially inward direction.

3. A brushless rotary electric machine according to claim 1, wherein each of the cooling fins is provided to extend inwardly in an axial direction to reach an end surface of the exciting core.

4. A brushless rotary electric machine according to claim 1, wherein the first bracket and the exciting core are in close contact with each other through an intermediation of a thermally-conductive compound therebetween.

5. A brushless rotary electric machine according to claim 1, wherein the brushless rotary electric machine comprises a brushless AC generator for a vehicle.

* * * * *